US007658829B2

(12) United States Patent
Kanagasabapathi et al.

(10) Patent No.: US 7,658,829 B2
(45) Date of Patent: Feb. 9, 2010

(54) INTEGRATED MICROFLUIDIC TRANSPORT AND SORTING SYSTEM

(75) Inventors: Thirukumaran T. Kanagasabapathi, Calgary (CA); Karan V.I.S. Kaler, Bragg Creek (CA); Thomas B. Jones, Rochester, NY (US)

(73) Assignees: UTI Limited Partnership, Calgary, Alberta (CA); University of Rochester, Rochester, NY (US)

( * ) Notice: Subject to any disclaimer, the term of this patent is extended or adjusted under 35 U.S.C. 154(b) by 832 days.

(21) Appl. No.: 11/163,628

(22) Filed: Oct. 25, 2005

(65) Prior Publication Data

US 2006/0226012 A1 Oct. 12, 2006

Related U.S. Application Data

(60) Provisional application No. 60/669,697, filed on Apr. 8, 2005.

(51) Int. Cl.
*G01N 27/447* (2006.01)

(52) U.S. Cl. .................................................... 204/547

(58) Field of Classification Search ................. 204/450, 204/547, 600, 643
See application file for complete search history.

(56) References Cited

U.S. PATENT DOCUMENTS

| | | | | |
|---|---|---|---|---|
| 4,390,403 A * | 6/1983 | Batchelder | .................. | 204/547 |
| 7,255,780 B2 * | 8/2007 | Shenderov | .................. | 204/450 |
| 2003/0173223 A1 | 9/2003 | Gascoyne et al. | | |

OTHER PUBLICATIONS

Youlan, L., et al., "Dielectrophoretic fluidic cell fractionation system," Analytice Chimica Acta, Apr. 1 2004, pp. 151-161, v507.

Hughes, M.P., "AC electrokinetics: applications for nanotechnology", Nanotechnology, Jun 2000, pp. 124-132, v11.

Pethig, R., Markx, G.H., "Applications of dielectrophoresis in biotechnology", Trends Biotech., Oct. 1997, pp. 426-432, v15.

Wang X., Huang, Y., Gascoyne, P.R.C., Becker, F.F. "Dielectrophoretic Manipulation of Particles", IEEE Trans, Ind. Appl. May/Jun. 1997. pp. 660-669, v33.

Chan, K.L., Morgan, H., Morgan, E., Cameron, I.T., Thomas, M.R., "Measurements of the dielectric . . . etc.", Biochim. Biophys. Acta, Mar. 17, 2000, pp. 313-322, v1500.

Gascoyne, P.R.C., Huang, Y., Pethig, R., Vykoukal, J., Becker, F.F., "Dielectrophoretic Separation . . . etc.", Meas. Sci. Technol., May 1992 pp. 439-445, v3.

Gascoyne, P.R.C., Wang, X., Huang, Y., Becker, F.F., "Dielectrophoretc separation . . . etc.", IEEE Trans. Ind. Appl., May/Jun. 1997, pp. 670-678, v33.

(Continued)

*Primary Examiner*—Alex Noguerola
(74) *Attorney, Agent, or Firm*—Fulbright & Jaworski L.L.P.

(57) ABSTRACT

The invention integrates a two-stage dielectrophoretic (DEP) droplet dispensing and distribution system with particulate DEP to create a novel LOC platform capable of manipulating biological cells based on the varied dielectrophoretic signatures that distinguish cells in a population, for example, healthy from diseased cells. The two-stage DEP droplet transport system acts as the backbone of this application, providing the essential dispensing and distribution function, while particulate DEP provides the critical capability to characterize and analyze the heterogeneous biological cell populations routinely encountered in biotechnology and clinical settings.

21 Claims, 8 Drawing Sheets

OTHER PUBLICATIONS

Green, N. G., Morgan, H., "Separation of submicrometer . . . etc.", J. Phys. D: Appl. Phys., Apr. 7, 1998, pp. L25-L30, v31.
Becker, F.F., Wang, X., Huang, Y., Pethig, R., Vykoukal, J., Gascoyne, P.R.C., "Separation of human . . . etc.", Proc, Natl. Acad. Sci. U.S.A., Jan. 1995, pp. 860-864, v92.
Wang, X., Vykoukal, J., Becker, F.F., Gascoyne, P.R.C., "Separation of Polystyrene . . . etc. ", Biophy. J., May 1998, pp. 2689-2701, v74.
Wang, X., Yang, J., Huang, Y., Vykoukal, J., Becker, F.F., Gascoyne, P.R.C., "Cell Separation . . . etc,", Anal. Chem., Feb. 15, 2000, pp. 832-839, v72.
Talary, M.S., Burt, J.P.H., Tame, J.A., Pethig, R., "Electromanipulation and Separation . . . etc.", J. Phys. D: Appl. Phys., Aug. 14, 1996, pp. 2198-2203, v29.
Morgan, H., Green, N.G., Hughes, M.P., Monaghan, W., Tan, T.C., "Large area travelling . . . etc.", J. Micromech. Microeng., Jun. 1997, pp. 65-70, v7.
Fiedler, S., Shirley, S.G., Schnelle, T., Fuhr, G., "Dielectrophoretic sorting . . . etc.", Anal. Chem., May 1, 1998, pp. 1909-1915, v70.
Jones, T.B., GUNJI, M., Washizu, M., Feldman, M.J., "Dielectrophoretic liquid actuation and nanodroplet formation", J. Applied Physics, Jan. 15, 2001, pp. 1-8, v89(3).
Schasfoort, R.B.M., Schlautmann, S., Hendrikse, J., and Van Dan Berg, A., "Field Effect Flow Control . . . etc.", Science, Oct. 26, 1999, pp. 942-945, v286.
Stroock, A.D., Weck. M.D., Chin, T., Chiu, W.T.S., Huck, T.S.P., Kenis, J.A., Ismagilov, R.F., Whitesides, G.M., Phys. Rev. Lett., Apr. 10, 2000, pp. 3314-3317, v84.
Gallardo, B.S., Gupta, V.K., Eagerton, F.D., Jong, L.I., Craig, V.S., Shah, R.R., and Abbott, N.L., "Electrochemical Principles . . . etc.", Science, Jan. 1, 1999, pp. 57-60, v283.
Washizu, M., "Electrostatic Actuation of Liquid Droplets for Microreactor Applications", IEEE Trans. Ind. Appl. Jul./Aug. 1998, pp. 732-737, v34.
Jones, T.B., Gunji M., and Washizu, M., "Dielectrophoretic microfluidic devices," Proc. of IEJ/ESA Joint Symposium on Electrostatics, Sep. 2000, pp. 78-87.
Yogi, O., Kawakami, T., Mizuno, A., "On-Demand Mixing Droplet Spotter for Preparing Picoliter Droplets on Surfaces", Anal. Chem., Jun. 1, 2004, pp. 2991-2996, v76(11).
Jones, T.B., "Electrostatics and Lab on a chip", Institute of Physics Congress, Mar. 2003, Edinburgh.
Jones, T.B., "Liquid dielectrophoresis on the microscale", Electrostatics, May 2001, pp. 290-299, v51-52.
Fuhr, G., Shirley, S.G., "Cell Handling and Characterization", J. Micromech. Microeng., Jun. 1995, pp. 77-85, v5.
Hughes, M.P., Morgan, H., "Dielectrophoretic Trapping . . . etc.", J. Phys. D: Appl. Phys., Sep. 1998, pp. 2205-2210, v31.
Sano, H, Kabata, H., Kurosawa, O., Washizu, M., "Dielectropho . . . etc.", Technical Digest (IEEE) 15th Int'l Conf. on Microelectromechanical Systems, Jan. 20-24, 2002, pp. 11-14.
Ahmed, R., Hsu, D., Bailey, C., Jones, T.B., "Dispensing Picoliter Droplets, etc.", Microscale Thermophysical Engineering, Jul./Sep. 2004, pp. 271-283, v8.
Ahmed, R., Jones, T. B., "Dispensing picoliter droplets on substrates using dielectrophoresis," J. Electrostatics, Jul. 2006, pp. 543-549, v64.
King, M.R., Lomakin, O.A., Ahmed, R., Jones, T., "Size-Selective Deposition . . . etc.", Journal of applied physics, Feb. 1, 2005, 054902, vol. 97.
Weigl, B. H., Bardell, R.L., Cabrera, C.R., "Lab-on-a-chip . . . etc.", Adv. Drug Delivery Rev., Feb. 24, 2003, pp. 349-377, v55.
Lee, J., Moon, H., Fowler, J., Schoellhammer, T., Kim, C.-J., "Electrowetting and . . . etc.", Sens. Actuators A, Jan. 1, 2002, pp. 259-268, vA95.
Yang, J., Huang, Y., Wang, X.B., Becker, F.F., Gascoyne, P.R., "Differential Analysis . . . etc..", Biophys. J., May 2000, pp. 2680-2689, v78.
Ahmed R., and Jones, T.B., "Dispensing Picoliter . . . etc.", 5th International Electrohydrodynamics Workshop, Sep. 2004, pp. 283-288, Poitiers, France.
Kaler, K.V.I.S., and Pohl, H.A., "Dynamic Dielectrophoretic Levitation, etc.", IEEE Trans. Ind. Apps., Nov./Dec. 1983, pp. 1089-1093. v1A-19.
Pethig, R., Huang, Y,, Wang, X.B., Burt, J.P.H., "Positive and negative electrophoretic . . . etc.", J. Phys. D: Appl. Phys., Jun. 14, 1992, pp. 881-888., v24.
Lee, J., Kim, C.-J., "Microactuation by Continuous Electrowetting Phenomenon . . . etc. ", ASME Int. Mechanical Engineering Congress and Exposition, Nov. 1998, p. 475, Anaheim, CA.
Shapiro, B., Moon, H., Garrell, R. L., Kim, C.-J., "Equilibrium behavior of sessile drops under . . . etc.", Journal of Applied Physics, May 1, 2003, p5794, v93.
Vallet, M., Berge, B., Vovelle, L., "Limited Phenomena for the spreading . . . etc.", The European Physical Journal B, Oct. 1999, pp. 583-591, v11.
Vallet, M., Berge, B., Vovelle, L., "Electrowetting of water and aqueous . . . etc", Polymer, Jun. 1996, pp. 2465-2470, v37.
Zeng, J., Korsmeyer, T., "Liquid Disintegration: Investigation . . . etc.", Nanotech 2004 Conference Proceedings, Mar. 7-11, 2004, Cambridge, MA.
Tombak, A., et. al, "Tunable Barium Strontium Titanate Thin Film . . . etc.", IEEE Microwave and wireless components letters, Jan. 2002, pp. 3-5, v12.
Gascoyne, P.R.C., et. al, "Dielectrophoresis-based programmable fluidic processors", Jul. 2004, pp. 299-309, v4.
Kaler, K., "Nanotechnology and Medical Devices", Western Canada Technology Study Tour, Oct. 26, 2004, Powerpoint Presentation.
Kanagasabapathi, T., et al., "Dielectrophoresis (DEP) of cells and microparticles in PDMS microfluidic channels", Proc. Nanotech Mar. 2004, pp. 81-84, (1-2).
CUI, L., et al., "The dielectrophoretic levitation and separation of latex beads in microchips.", Electrophoresis, Oct. 2001, pp. 3893-3901, v22.
Gascoyne, P., et al., "Particle separation by Dielectrophoresis. ", Electrophoresis, Jul. 13, 2002, pp. 1973-1983, v23.

* cited by examiner

INTEGRATED MICROFLUIDIC TRANSPORT AND SORTING SYSTEM

CROSS-REFERENCE TO RELATED APPLICATIONS

This application claims the benefit under 35 USC 119(e) of provisional application No. 60/669,697 filed Apr. 8, 2005.

BACKGROUND OF THE INVENTION

Development of miniaturized (micro) total analysis systems (μTAS) is of increasing interest in the biomedical research community. Often referred to as 'Laboratory-on-a-chip' (or LOC), this technology offers new prospects for health care delivery and biomedical research. Envisioned are microsystems for massively parallel chemical analysis, drug testing, bioassay, and diagnostic devices for non-invasive, early detection of cancers and other serious health problems.

Real biological cells, such as erythrocytes, cells derived from tissue, and microbial cells express a high degree of heterogeneity in a typical population. When subjected to non-uniform electrical fields, individual cells in these populations manifest a wide range of AC electrokinetic responses and behaviors [1-3]. References indicated by numerals in square brackets are listed at the end of the disclosure and incorporated by reference herein. Furthermore, these characteristic dielectric fingerprints are quite sensitive to the sample environment. Specifically, the frequency-dependent polarization response reflected in the dielectrophoretic (DEP), electrorotation (ROT) and traveling wave dielectrophoresis (TW-DEP) spectra of viable, nonviable and/or diseased cells manifest highly distinguishable characteristics in certain regions of the frequency spectrum.

In the past, cellular DEP has been practiced primarily using closed fluidic chambers or interconnected microchannels interfaced to external fluid pumping and sample injection hardware [2, 4]. Such systems, particularly those employing microfluidic channels for cell collection and separation, usually require sample preprocessing and are often plagued by micro-channel blockage. By their very nature, closed channel microfluidic systems are very complex structures, requiring extensive on-chip valving and flow control devices. The pressure differentials required to force liquids through the narrow channels are sufficiently high (~$10^5$ Pa) are high enough so that leakage becomes a concern. For successful commercialization in microfluidic cell analysis/sorting devices, these problems must be overcome.

An attractive alternative to the closed channel microfluidic systems is open-channel microfluidics for micro and potentially nanoscale DEP-actuated fluidic transport and subsequent particle manipulation [5, 6]. In the preferred embodiment of such open systems, droplets themselves serve as the carriers for the cells or biological molecules and the reagents needed for biochemical protocols. Because the liquid samples are sessile droplets residing on an open substrate, such systems are immune to microchannel blockage. The basic design rules for DEP droplet dispensing have been published in two papers [10, 11]. King et al. showed that particles can be transported using transient liquid DEP actuation [12] with sorting based on particle size. The present application addresses a novel approach for particle sorting that builds upon DEP actuated liquid transport.

SUMMARY OF THE INVENTION

According to an aspect of the invention, there is provided an integrated droplet-based, DEP-actuated microfluidic device with integral DEP particle processing. According to a further aspect of the invention, there is provided apparatus, comprising:

a first electrode set defining a first flow path for liquid along a first gap between electrodes of the first electrode set;

a second electrode set defining a second flow path for liquid along a second gap between electrodes of the second electrode set;

an intermediate electrode station formed by an intersection between the first electrode set and the second electrode set, the intersection incorporating an electrode configuration for supplying a voltage gradient at the intermediate electrode station; and voltage sources connected to the first electrode set, second electrode set and the intersection for separately supplying dielectrophoresis voltage to the first electrode set, second electrode set and the intermediate electrode station.

According to another aspect of the invention, the second electrode set may comprise plural electrode stations.

According to a further aspect of the invention, there is provided apparatus, comprising:

a first dielectrophoretic actuator incorporating a first set of electrodes defining a first flow path for liquid, the first flow path extending to an intermediate electrode station;

a second dielectrophoretic actuator incorporating a second set of electrodes defining a second flow path for liquid extending from the intermediate electrode station to a plurality of electrode stations; and the intermediate electrode station incorporating electrodes configured for establishing an electric field gradient at the intermediate electrode station that is capable of isolating particles carried by the liquid upon application of a dielectrophoretic voltage to the electrodes at the intermediate electrode station.

According to still further aspects of the invention:

The first set of electrodes and the first flow path may extend to plural intermediate stations.

The apparatus may comprise multiple dielectrophoretic actuators, each of the multiple dielectrophoretic actuators incorporating a set of electrodes defining a flow path for liquid extending from respective ones of the intermediate electrode stations to respective sets of electrode stations.

The electrode stations may be spaced at spaced at intervals corresponding to Rayleigh instability points.

The intermediate electrode stations may each comprise interdigitated electrodes. Other DEP electrode arrangements may be used for particle separation.

The electrode stations may comprise bumps on the electrodes.

The electrodes of any electrode set have a width between bumps, the bumps of an electrode set are formed of semicircles having a radius; and for any electrode set, the width of the electrodes may equal the bump radius. Other geometries of bumps may be used.

The electrodes may be patterned on the surface of a substrate, either directly or on a coated surface, such as a dielectrically coated surface of a substrate.

The flow paths are open, as defined in the detailed description.

The electrodes may be coated with a dielectric material.

One of the intermediate electrode stations may be a traveling wave dielectrophoretic actuator.

The apparatus is provided with heat dissipation structures. Heat dissipation may also be obtained through a thermally conductive substrate material such as mica.

An intermediate electrode station may be provided with electrodes leading towards it from multiple droplet reservoirs, to enable mixing to take place at the intermediate electrode station.

The electrodes may be patterned on a chip provided with capillaries, and the electrodes may define flow paths that terminate at an opening into a capillary.

According to a further aspect of the invention, there is provided a method of sample separation, the method comprising the steps of:

applying dielectrophoretic forces to a liquid to cause the liquid to move along a flow path to an intermediate station;

applying dielectrophoretic forces within the liquid at the intermediate station to cause a separation of material carried by the liquid; and applying dielectrophoretic forces to the liquid along a flow path to remove material separated at the intermediate station.

The method may be carried out using the features of the apparatus of the invention.

The method may further comprise removal of separated material from the intermediate stations to further stations along a flow path.

Further processing of the separated material may occur at the further stations. The further stations may also be configured for high electric field gradient and the separated material may be subject to a second stage separation process for example using DEP with a different frequency window from a frequency window used at the intermediate stations.

Material isolated by a DEP separation process at the further stations may be drawn by DEP along a still further flow path to an additional set of stations.

The method may be applied to the separation of particles, such as cells, carried by the liquid. The cells may contain DNA and the process may further comprise lysing of the cells and treatment of the cell contents such as DNA by PCR. Cell lysing and PCR may be carried out in droplets at the stations.

Detection of material in the populations at the intermediate stations or at the further stations may be carried out, for example using fluorescence detectors or other optical means.

The electrodes may be used to transport liquid and material carried by the liquid to an entry into a capillary electrophoresis channel, where the material may be subject to capillary electrophoresis.

Other aspects of the invention are included in the detailed description of preferred embodiments.

BRIEF DESCRIPTION OF THE FIGURES

There will now be described preferred embodiments of the invention by way of example, with reference to the figures, in which.

DETAILED DESCRIPTION OF THE PREFERRED EMBODIMENTS OF THE INVENTION

In this patent document, "comprising" is used in its inclusive sense and does not exclude other elements being present. Also, the indefinite article "a" before an element does not exclude another of the element being present. The word "particle" includes any substance, including an inorganic material, liquid droplet, molecule such as DNA, RNA or other subcellular components, or cell, that is capable of being affected by a dielectrophoretic field. "Open" means free from lateral constraint by solid objects except for constraint by a single supporting surface that provides lateral constraint in one direction.

In an exemplary embodiment of the invention, DEP and EWOD microfluidics serve as a controllable plumbing system, dispensing, transporting, and manipulating droplets of biological media containing cells and cellular components as well as chemicals and washing solutions needed to perform prescribed cell separation processes. Droplet manipulation steps are conducted first using fixed coplanar electrode structures and relatively higher voltages to distribute equal quantities of the sample to each of a large number of stations. Then, cell-level separation, trapping, and beneficiation operations are initiated at each station by exciting fine structure electrodes embedded in the microfluidic structure with much lower voltages. Voltage magnitudes, application intervals, and frequencies are individually programmed for each station, allowing parallel processing of large numbers of identical samples according to a prescribed set of conditions. Next, if the cells have been suitably stained or labeled to distinguish them based on some attribute (e.g., healthy versus cancerous), fluorescent intensities of the sample at each station can be interrogated to quantify numbers of cells utilizing optical microscopy. The scheme is amenable to a modular design, can be scaled readily, and is limited only by the signal generation and identification hardware. The invention provides a unique capability for parallel DEP processing of small inventories of fluids containing a cell mixture. Multiple frequency modules permit cell partitioning into two or more sub-populations.

A microfluidic device of the type disclosed here is particularly suited to use as a laboratory on a chip device by combining and integrating two critical elements: (i) liquid dielectrophoretic actuation for the microfluidic subsystem and (ii) particulate dielectrophoresis to separate particles such as cells based on their frequency-dependent, dielectric spectra.

Figure 1:
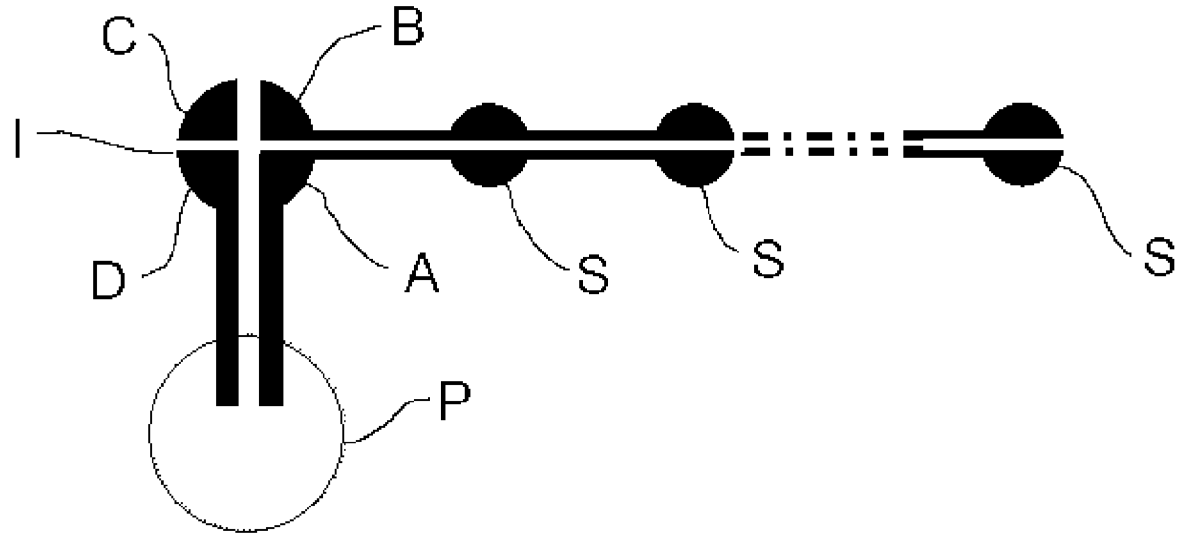
FIGS. 1 and 1A illustrate respectively first and second embodiments of fluid actuation with a two-stage droplet formation structure (actuator)

In FIG. 1 the electrodes A, B, C and D are patterned in coplanar, evaporated metal on an insulating substrate (not shown in FIG. 1, but see FIG. 7 for an example substrate) such as a borosilicate glass and then covered with a suitable, thin dielectric layer. For purposes of explaining the operation of the droplet dispenser, the figure shows only a two-stage droplet generator, but three-stage and more complex structures may be exploited in the invention. The electrodes A, B, C and D are individually addressable. A sample of liquid is dispensed onto a parent station P formed by symmetrical, adjacent enlargements of the electrodes A and D. The liquid may be dispensed by micropipetting or other suitable techniques now know or hereafter developed. For the study of particle characteristics, the liquid will contain particles to be analyzed.

Figure 3:
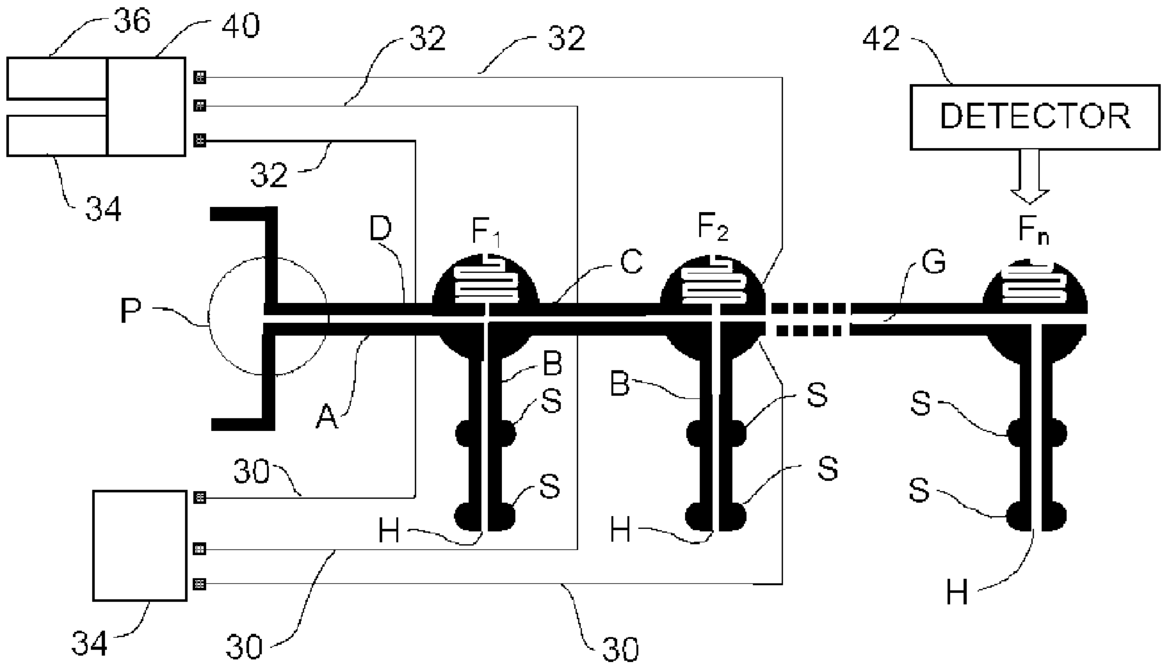
FIG. 3 is a schematic of a microfluidic device according to the invention for carrying out a multifrequency DEP cell sorting technique.

Parallel strip portions of electrodes A and D extend away from parent station P to an intermediate station I formed of enlargements of the electrodes A, B, C and D arranged in quadrants. Parallel strip portions of electrodes A and B extend away from reservoir R to a series of stations S, each formed of enlargements of the corresponding electrodes A and B. Multiple intermediate stations can be added above station I as shown in FIG. 3 and large numbers of the smaller droplet forming stations S can be linked to each station I to form multiple parallel processing sections. Each station S may have the same topography as the intermediate station I and have electrodes extending toward further sub-stations in the same manner as electrodes A and B extend from the station I towards stations S. Electrodes B and C may also extend away from the intermediate station I in the opposite direction to reservoir P to a further reservoir P' as shown in FIG. 1A.

When a voltage is applied momentarily between electrodes A and D and between electrodes B and C, an electric field is established in the gap between the electrodes A and D and in the gap between electrodes B and C. This electric field draws a finger or rivulet of liquid from the parent droplet along the flow path established by the electrodes A and D towards the station I according to known principles of dielectrophoresis. The liquid is drawn to areas of high field gradient. If additional intermediate stations $I_n$ are formed beyond station I, the liquid will flow through to these stations as well, provided sufficient voltage is applied. The liquid projects out very rapidly from the parent station P along the electrode flow path and rapidly covers the intermediate station I to form an intermediate reservoir of sample liquid. With electrodes A and D having a width in their strip portions of 60 microns, and being spaced by a gap of 60 microns, with water as the liquid and a voltage in the order of 240 volts RMS at 100 kHz, the station I fills in about ~$10^2$ milliseconds. As soon as the actuation voltage is removed, the rivulet connecting the large droplet at P to the intermediate station I drains rapidly, leaving an isolated sub-microliter volume droplet at station I. This process occurs in ~10 milliseconds. In the second stage of operation, voltage is applied between electrodes C and D and between electrodes A and B. In response, a liquid finger forms and moves to the right from the intermediate station I along the flow path established by the electrodes A and B to fill the stations S. Only a few of the stations S (sometimes called bumps) are shown, but the array can consist of as many as twenty or more and they need not be in a straight line. Subsequent removal of voltage results in the formation of one sessile droplet atop each of these stations S. Formation of droplets on the stations S takes less than ~10 milliseconds for electrodes A, B, where the strip width of the electrodes A, B between stations S is 30 microns, water is used for the liquid and a voltage of 130 volts RMS at 100 kHz is used.

When water is used as the carrier liquid, the electrodes need to be coated with a dielectric to avoid ionization of the water. In addition, if a dielectric liquid is used as a carrier liquid, the electrodes should still be coated with dielectric for use in analyzing particles that might be ionized by the electrodes. In some situations, where for example only dielectric liquids are to be separated or analyzed, without particles, the electrodes need not be covered by dielectric.

Figure 1A:
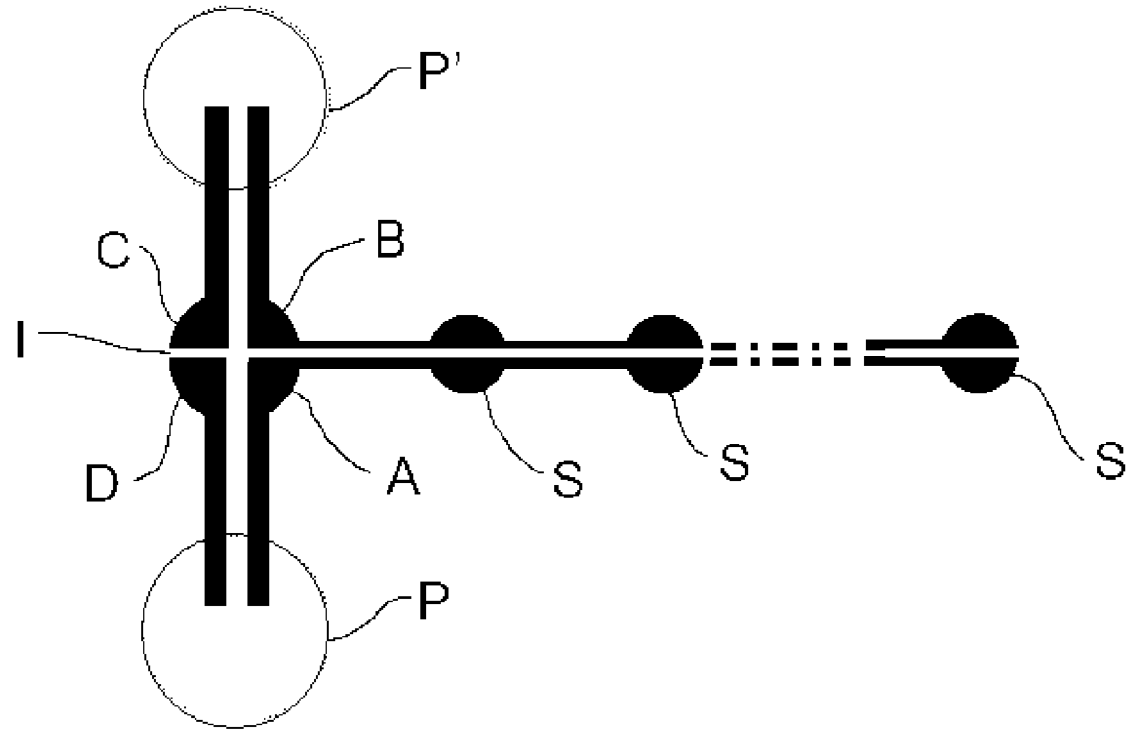

In the example shown in FIG. 1A, liquid droplets deposited onto reservoirs P and P' may be mixed by simultaneous, or sequential, application of AC voltage between electrodes A and D and between electrodes B and C. Fingers of liquid move under DEP towards the intermediate station I where mixing occurs. Chemical reactions may take place at station I as a result of mixing with appropriate selection of the liquids applied to reservoirs P and P'.

Figure 2A:
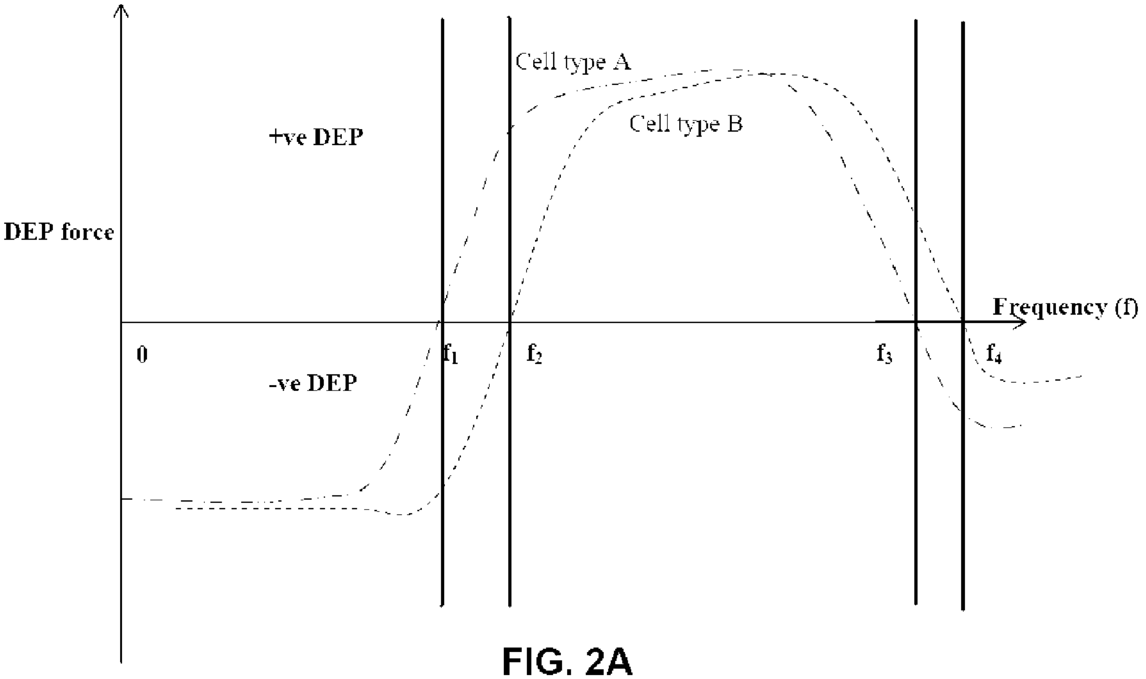
FIG. 2*a* is a graph showing an exemplary DEP polarization spectrum of two different cell types (A and B)

After formation of droplets on the stations I, particulate DEP is used to separate and fractionate particles such as cells or cell components suspended in the liquid samples that have been manipulated and dispensed by the DEP microfluidic subsystem. The foundation of particle manipulation of cells suspended in liquids is the frequency dependence of the force as revealed in FIGS. 2*a* and 2*b*. Consider a fluid sample containing a suspension of cell consisting of two different cell types, A and B, with the DEP force spectra as shown in FIG. 2*a*. The spectra of A and B, although generally similar in form, feature narrow frequency bands where one cell type has a positive DEP response while the other a negative response. In particular, for the frequency range from $f_1$ to $f_2$, cell type A exhibits positive DEP (attracted to high field regions) while cell type B exhibits negative DEP (repelled from high field regions). Very effective DEP schemes for separating cells can be based on exploiting these frequency "windows".

Fine electrode structures are embedded into the electrodes at the stations I (FIG. 1 and FIG. 3, where the intermediate stations are labelled $F_i$). Fine electrode structures create local, isolated field intensity maxima and minima to effect a desired separation of particles such as cells based on recognized differences in their dielectric signatures. In particular, the fine structure may be used to attract and collect one cell type on the electrode surfaces due to positive DEP while simultaneously repelling another cell type from the electrodes at the station I, thereby achieving physical separation of two cell populations. FIG. 2*a* reveals another potential separation frequency window, $f_3$-$f_4$, in the high frequency end of the spectrum. In this region, cell type A can be repelled from the electrodes by negative DEP while cell type B is attracted to the electrodes and collected due to positive DEP. This example shows that more than one frequency window for separation may be available for DEP processing of cells.

Figure 2B:
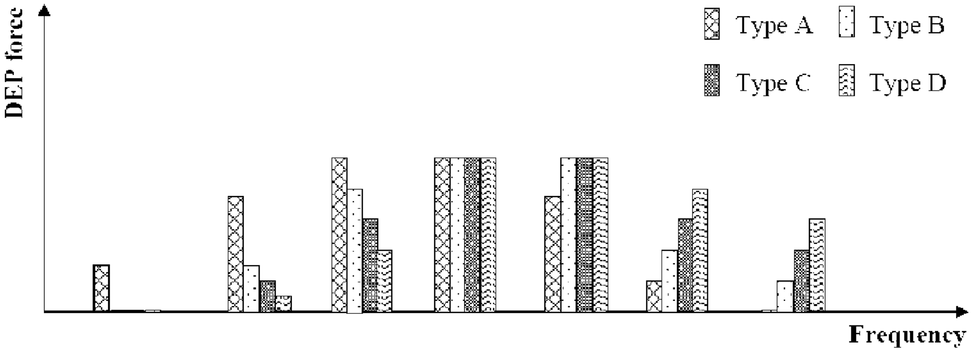
FIG. 2*b* is a graph showing frequency response of a heterogeneous sample consisting of cell types A, B, C and D.

DEP-based separation or fractionation is not limited to binary sorting of two different cell types, but can be extended to more complex populations. For example, consider a cell sample containing a mixture of four different cell types A, B, C and D, which have distinct differences in their polarization spectra. The DEP separation strategies discussed above can be employed successfully to isolate individual cell types at properly selected frequencies. The bar graph in FIG. 2*b* shows the fractional collection percentages of cells of the four cell types versus frequency. Establishing frequency window for each individual cell type helps to isolate particular cells from the rest of a heterogeneous population.

FIG. 3 shows one embodiment of an integrated DEP cell sorting invention that exploits the DEP liquid actuation technique with positive and negative cellular DEP. As in FIG. 1, a parent station P is connected via electrodes A, D to intermediate station $F_1$ and thence via electrodes B, C to intermediate station $F_2$ and so on. A gap G is defined between the electrodes A and D and between the electrodes B and C, and gaps H between the electrodes extending out to the stations S. The gaps G, H and the electrodes forming the gaps create flow paths for liquids drawn by dielectrophoresis. The electrodes at the intermediate stations $F_1$, $F_2$ . . . $F_n$ are provided with a fine structure that provides a high voltage gradient at the intermediate stations. Electrodes such as electrodes A, B extend away from the intermediate stations $F_i$ to stations S. The fine scale may be formed in any suitable manner, such as the interdigitation shown for electrodes C, D at station $F_1$. High voltage lines 30, 32 connect a high voltage source 34 to the electrodes defining the gap or flow path G. A low voltage source 36 may be connected using the lines 32 and high-low voltage switches 40 to the fine structure electrodes at stations $F_i$. Although one voltage source structure is shown, any of various structures may be used to deliver voltages to the electrodes.

The process steps carried out by the apparatus of FIG. 3 are: 1) In a liquid actuation step, liquid is driven to the individual intermediate stations $F_i$ by application of high voltage, and then the liquid actuation voltage is removed to form droplets at each intermediate station; 2) In a particle separation step, the interdigitated electrodes at the stations $F_i$ are excited by low voltage AC at a dielectrophoretic frequency to create a highly local nonuniform electric field within each droplet to trap a targeted subpopulation of cells, while leaving the remainder of the population in suspension; and 3) In a further liquid actuation step, liquid is drawn by DEP from the intermediate stations to separate the suspended particles from the targeted sub-population.

For example, the liquid placed at the station P in FIG. 3 may be a microliter liquid sample containing biological cells. Brief application of voltage to the electrodes on either side of the gap G dispenses identical volumes of the cell-bearing analyte solution to stations $F_1$, $F_2$, . . . $F_n$. At this stage of the process, each station contains the same quantity of similar sized cells from the original heterogeneous cell population. If more than one cell size is present, a sorting will occur with smaller cells tending to be drawn further along the gap G. Next, low voltage AC signals at an appropriate set of frequencies are applied to the fine-structure, interdigitated electrodes at each station $F_i$. Thus, trapping/collection of specific but different sub-populations from the cell samples occurs at each station $F_1$. After a collection period during which targeted cells are attracted by positive DEP to the interdigitated structures, low-voltage DEP voltage is removed and the high voltage actuation voltage is applied across the gap H for a short interval to move liquid to the stations S. Cells that have been repelled from the interdigitated electrode structure and have remained in suspension due to negative dielectrophoresis are thus removed from stations $F_1$, $F_2$, . . . $F_n$ to stations S. A detector 42 may then be used to detect the particles collected at each station $F_1$, $F_2$, . . . $F_n$ or at any station S. The detector 42 may be any suitable detector for the detection of particles. The particles may be detected at the stations by suitable location of the detector 42 or removed for analysis in the detector 42. DEP liquid actuation may also be used to convey the targeted particles to the detector 42 using additional electrodes, not shown, but using the same principles as described in relation to FIG. 1. For example, removal electrodes could extend from the stations $F_1$, $F_2$, . . . $F_n$ away from the electrodes defining the gaps H, and be provided with their own voltage source.

The device shown in FIG. 3 may also be used for extracting DNA as part of a polymerase chain reaction (PCR). Cells are sorted dielectrophoretically at any one or more of the locations $F_1$, $F_2$, . . . $F_n$. The sorted cells are moved to the stations S, using liquid-DEP techniques as described above in relation to FIG. 3. At the stations S, substantially all cells will be of a particular population (~99% expected purity) and cells thus sorted may be lysed at the stations S using conventional techniques, such as electroporation, to extract DNA for subsequent PCR reactions at the stations S. Electroporation pulses may be generated by the high voltage source 34 or other suitable means. The apparatus of FIG. 3 thus may be used to transport, sort and lyse cells all in a single platform without the need for any human intervention during the entire process. Further, PCR reaction on DNA from the lysed cells by appropriate cycling may be performed at the same location, avoiding any contamination issues due to external sample transport.

Figure 4:
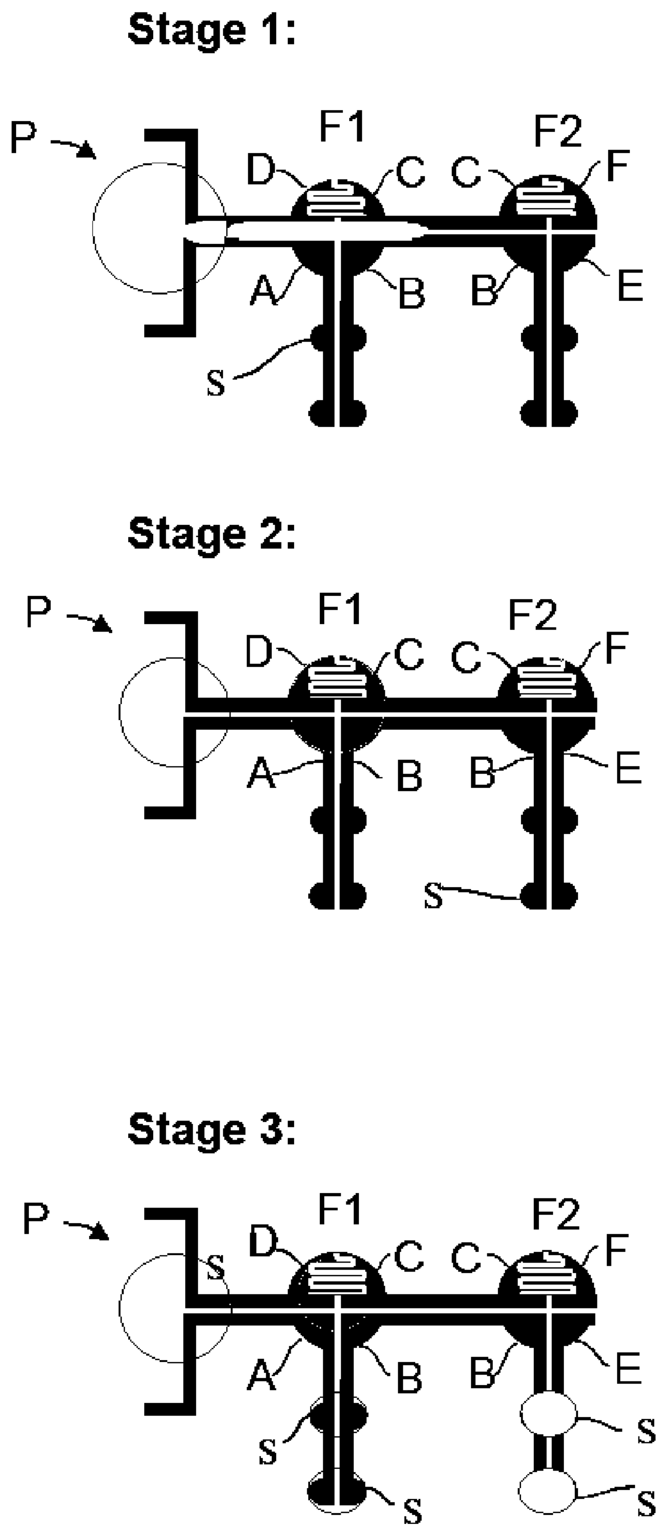
FIG. 4 is a schematic illustrating the principle of operation of multi-frequency, open-channel DEP cell sorting.

FIG. 4 illustrates the sequence of operational steps in the process. Cell sorting protocols of this general type can be used for characterising and manipulating biological cells based on their DEP spectra.

In stage 1 shown in FIG. 4, a droplet dispensing stage, high voltage is applied between electrodes A and D, with electrodes B and E connected in series with electrode A and electrodes C and F connected in series with electrode D. Parent droplet projects along electrode length in a rivulet forming smaller droplets at intermediate stations F1 and F2 after the high voltage is removed. (Figure shows droplet finger projecting towards F2).

In stage 2 shown in FIG. 4, a particulate DEP stage/Cell separation, low voltage/high frequency is applied between electrodes A and B and between electrodes C and D resulting in positive DEP. By exciting the regions F1 and F2 at different frequencies, collection of a particular cell type can be accurately controlled using the principles outlined and discussed in relation to FIGS. 2*a* and 2*b*. A field gradient developed across the interdigitated electrodes traps a particular cell type repelling the rest of the population to droplet periphery.

In stage 3 shown in FIG. 4, a cell collection stage, high voltage is applied across electrodes A and B with electrode A connected to electrode D and electrode B connected to electrode C, and across electrodes B and E with electrode C connected to electrode B and electrode F connected to electrode E. Cells along the periphery of F1 and F2 are collected at sub-satellite sites of the respective regions, and removed to the further stations S on the electrodes extending away from the intermediate stations F1 and F2.

Figure 5:
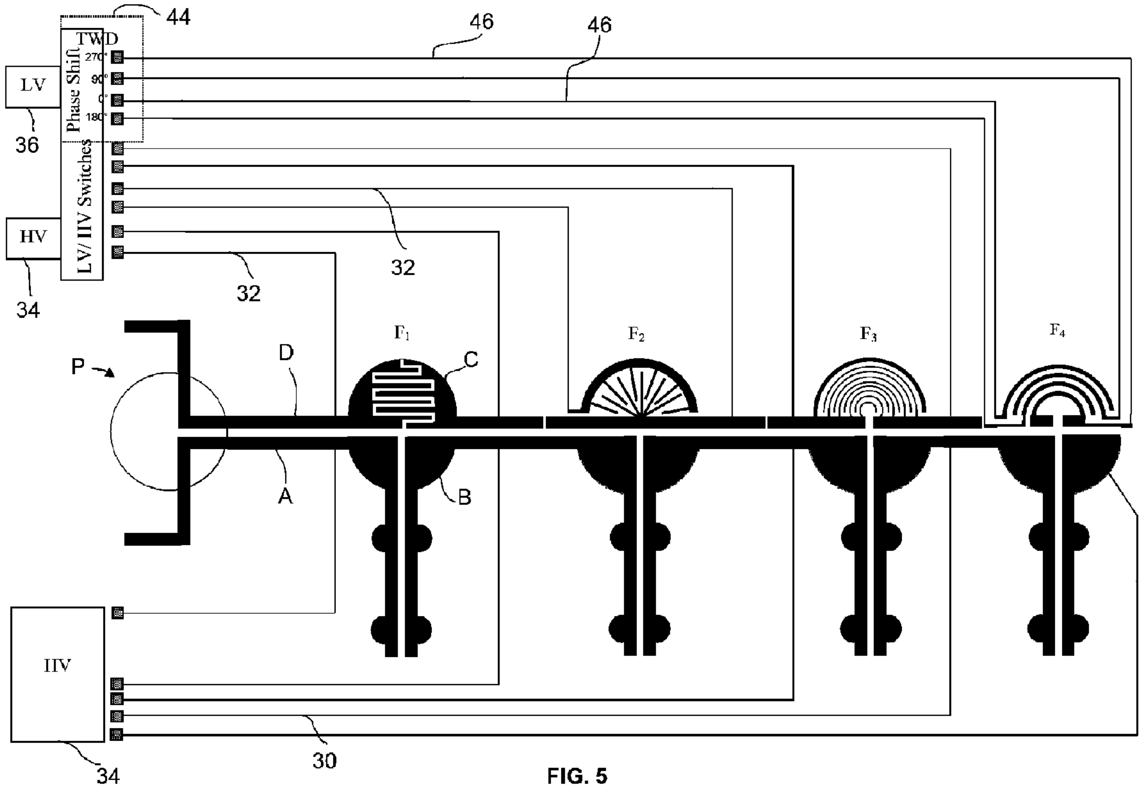
FIG. 5 is a schematic illustrating a two-stage DEP microfluidic actuator for frequency-based dielectrophoretic cell separation.

As revealed in FIG. 5, there are many embodiments for the fine structure patterned into the intermediate reservoirs $F_1$, $F_2$, . . . $F_n$. In $F_1$, the electrodes are formed of parallel interdigitations. At $F_2$, the electrodes are formed of radial interdigitations. At $F_3$, the electrodes are formed of circumferential interdigitations. These different electrode geometries all serve the same purpose of creating localized electric field gradients that are used to trap or repel biological cells suspended in liquid droplets based on the frequency-dependent DEP spectra of the cells. In all cases, the embedded fine structure of these electrodes requires protection during the DEP microfluidic actuation steps. This protection is achieved by connecting together the sections of the fine structure during application of the high voltage. This can be achieved by connecting the high voltage lines together so that the separate sides of the interdigitated electrodes are at a common potential. In FIG. 5, high voltage is supplied to the stations $F_1$, $F_2$, . . . $F_n$ from high voltage source 34 or low voltage source 36 through low voltage/high voltage switches 40 and lines 30 and 32 as shown and described in relation to FIG. 3.

A feature of this cell-sorting architecture is the ability to incorporate travelling wave dielectrophoresis (TW-DEP) into the structures. Refer to FIG. 5, which shows an array of TW-DEP electrodes patterned into the structure of station $F_4$. This scheme makes it possible to guide a subpopulation of cells towards the outer edges or periphery of the droplet, thereby facilitating more efficient cell sorting. In TW-DEP, the individual interdigitated electrodes of station $F_4$ are supplied with AC voltage from low voltage source 36 through lines 46 with a phase difference between the voltages applied to the different interdigitated electrodes of station $F_4$ by a phase shifter 44. The travelling wave of electric field gradient may be used to move the particles in a controlled manner at the station $F_4$.

Figure 6:
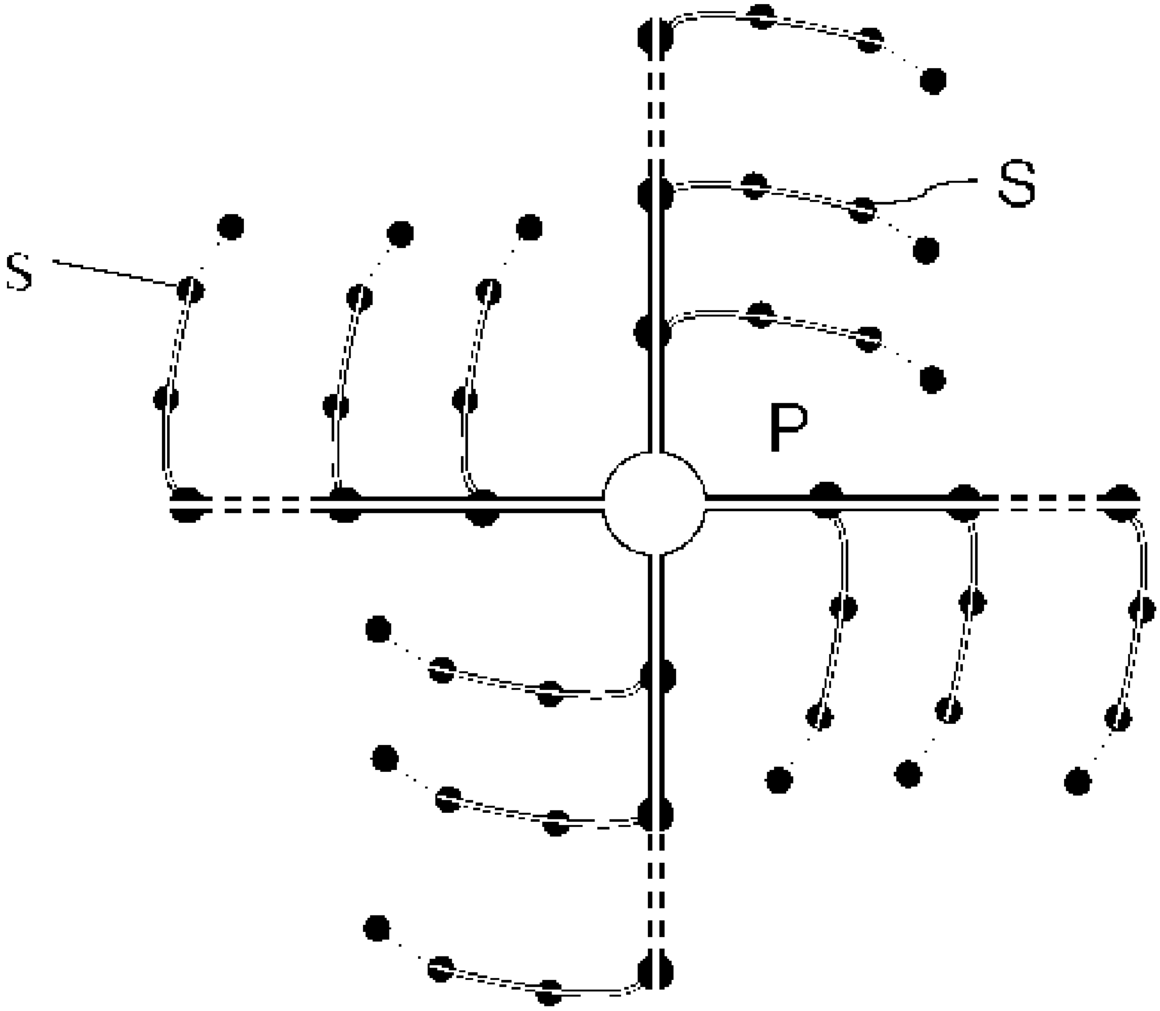
FIG. 6 is a schematic showing a radial electrode configuration of particulate and droplet DEP, in which an intermediate droplet region incorporates the interdigitated electrode for positive and negative DEP.

The DEP liquid actuation and droplet forming structures need not be restricted to a linear arrangement, but may assume other more compact, higher density structures. An example of one such radial electrode arrangement is shown in FIG. 6 where the stations S are formed along curved flow paths.

The frequency dependence of the liquid profile in DEP liquid actuation was explained by Jones et al [6]. The critical frequency ($f_c$) of the liquid profile can be estimated from an RC circuit model found in that citation. $f_c$ is dependent on the capacitive coupling of the planar electrodes to the sample of known conductivity and may be written as:

$$f_c = \frac{G_w}{2\pi(C_d/2 + C_w)} \quad (1)$$

where, $G_w$ and $C_w$ are the resistance and capacitance in the sample medium, and $C_d$ is the capacitance of the dielectric layer covering the electrodes. At frequencies less than $f_c$, the voltage drop occurs primarily across the dielectric layer and hence no significant DEP force can act on the droplet to shape its profile. Operation at a frequency greater than $f_c$ results in a strong non-uniform E field inside the liquid to effect particulate DEP. On the other hand, at frequencies significantly exceeding $f_c$, a significant fraction of the applied voltage ($V_a$) appears along the droplet. In this limit, the electric field in the liquid helps to shape the profile. The voltage developed across the droplet may be approximated as $$V_d = \frac{C_d/2}{C_d/2 + C_w} V_a \quad (2)$$

From this equation, we note that the voltage drop across the droplet increases with increasing dielectric layer capacitance ($C_d$). When materials of high dielectric constant such as strontium titanate, barium strontium titanate, and others, are used to coat the electrodes, the high dielectric constant of the dielectric layer increases the DEP actuation force acting on the liquid, but at the same time, could partially screen the electric field used for cell separation. This trade-off needs to be taken into account in design of an embodiment of the invention.

The innovation resulting from the integration of DEP fluid actuation with cellular DEP provides a new class of fluidic Microsystems, which find numerous applications in biological, biotechnology and clinical laboratories that rely or benefit from rapid, reliable and non-invasive DEP fractionation and fingerprinting of cells in suspension. The proposed open-channel platform technology is especially well suited to life science applications that demand real-time monitoring of cell population(s) grown in culture media. For example, the quantification of cell viability is an important parameter for the description of the status of cell cultures and is a basis for numerous cytotoxicity studies. In a clinical setting, the technology is attractive since it requires minimal sample for analysis compared to traditional laboratory techniques employing bench-top instrumentation and has good potential of it being practically applied to the early stage detection of various types of cancers in the human body. Cancer cells originating from different tissues may metastasize into peripheral blood while growing. The proposed invention may be used in a tool for the monitoring of the progression of leukemia therapy, through monitoring the proportion of such cancers in a minute blood sample. Such screening capability can furthermore be exploited to screen for HIV, hepatitis viruses, or other blood borne pathogens in potential donors.

Devices made in accordance with the invention may be integrated with other conventional microfluidic components such on chip PCR, and capillary electrophoresis. Such integrated systems may be used to perform genetic (DNA) analysis on a chip of a certain type or groups of cells to enable genetic profiling of high risk individuals or certain population groups on a routine basis. This type of premptive genetic screening capability will greatly benefit society by enabling efficient and cost effective delivery of diagnosis and therapy.

Figure 7:
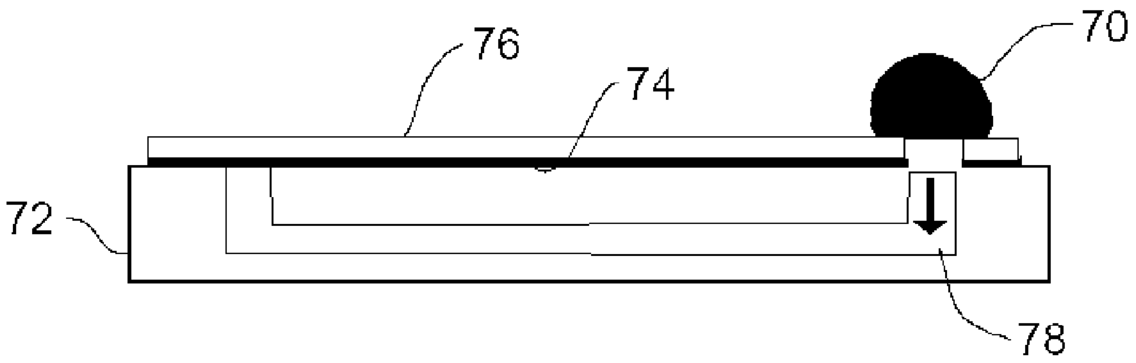
FIG. 7 is a cross sectional view of capillary electrophoresis (CE) microfluidic channels with liquid DEP electrodes patterned on top surface; in which cells are manipulated and separated on the top surface of the chips and cells of particular population are sent to the closed channels for further analysis using CE.

A device according to the invention may be built as a portable, automated hand held device that can monitor and detect the presence environmental pathogens in air and water supply targeted for human consumption. Applications for the device and method of the invention include: sample manipulation and division for closed microchannel LOC devices, and cell fractionation on the surface of capillary electrophoresis (CE) chips to eliminate contamination of samples due to intermediate handling stage. For example, as shown in FIG. 7, a droplet 70 may be transported across the surface of an open substrate 72 on electrodes 74 patterned on the surface of the substrate 72 and covered with a dielectric 76 such as aluminum oxide. The electrodes 74 have a termination point at an entry into a capillary electrophoresis channel 78. The droplet may be transported by DEP to an opening leading to the capillary electrophoresis channel 78 and there subjected to capillary electrophoresis in conventional fashion. A device made in accordance with the invention may also be used for the investigation of the effect of electric field exposure upon cell populations, and microbiological experiments and processing in a microgravity environment. A device according to the invention may be used for parallel processing of multiple primers used in PCR.

Care must be taken with the selection of dielectric coatings with high dielectric constant and good dielectric strength. To avoid negative effects of high voltage, which include ionization of particles and also the skipping of stations by the rivulet, it is preferred to operate at as low voltages as will provide adequate liquid actuation. Thin dielectrics of relatively high dielectric constant are thus preferred for electrode coatings. A material such as strontium titanate may be made 1 micron thick and it is believed based on theoretical calculations will function as a suitable dielectric at low DEP voltages of around 20 $V_{pp}$. Also, surface treatments should be used to reduce wetting hysteresis. SU-8™, Teflon™ and Paralyne™ may be used. Although designed for open channel use, nonetheless, a device according to the invention requires packaging technology to reduce possible sample contamination and evaporation. A cover made for example from PDMS (polydimethylsiloxane) may be used. Heat dissipation should also be maximized to deal with Joule heating effects, especially in aqueous biological media containing significant ions. Heat dissipation may be achieved through supporting the electrodes on a metal base with an insulator between the electrodes and the metal base. The metal base, for example made of aluminum, assists in achieving heat dissipation. Heat dissipation may also be achieved through coating the surface of the device with transformer oil or other relatively viscous oil, when aqueous media is used as the motive liquid. The water rivulet extends through the oil, underneath it, and the oil assists in heat dissipation from the liquid rivulet. The low-high voltage switches should preferably be housed on-chip. Care should also be taken to avoid bio-fouling problems.

The system is a breakthrough in parallel processing of small (sub-microliter) volume samples because it avoids the complex pumping and valving units of other, closed-channel microfluidic devices. The proposed system offers a simple, robust, and flexible architecture for sensitive, massively parallel diagnosis of cell disease, for example, early-stage cancerous "fingerprints". The invention realizes high-speed liquid actuation [actuation speed ~15 cm/sec.] on a truly open channel system and the formation of uniformly spaced equal volume droplets.

There will now be described factors influencing liquid actuation, formation of droplets at specific regions, capillary instability, volume and size of the droplets formed and the factors impacting the formation of uniform sized droplets.

On breaking the electric field applied to draw a rivulet along a flow path defined by a gap between electrodes, the rivulet disintegrates into uniform droplets influenced by the Rayleigh's instability criteria. The Rayleigh's theory predicts that the most unstable wavelength for a liquid rivulet to be 9.016×radius of the liquid rivulet. Formation of Nano-liter droplets from parent micro-liter droplets by this phenomenon was reported by one of the authors [6,9]. Further, to enhance the formation of uniformly sized droplets and to increase capillary instability, semicircular bumps were placed along the length of the electrode at locations that are integer multiples of Rayleigh's unstable wavelength.

Bumps at locations other than Rayleigh's instability point results in a non-uniform rivulet breakup. However, bumps located with a uniform $\lambda^*$ spacing [where $\lambda^*=9.016R$, the Rayleigh's unstable wavelength] resulting in the equal breakup of the rivulet into uniform sized pico-litre droplets on each bump. The ratio of bump radius to the rivulet radius has been found to be 1:1.

Depending on the application, particle DEP implementation in surface microfluidics may require suitable coating material to either promote or deter adhesion of bioparticles to the microfluidic surface. For example, mammalian cells in general are reported to have a high sticking coefficient, which normally hinders the movement of cells under negative DEP force. This may be particularly important for hydrophilic substrates, which are more prone to the adhesion of cells than hydrophobic substrates. Hydrophobic coatings such as Teflon, PDMS, Silicon-on-glass can be successfully used to provide the necessary hydrophobicity. Also, silicon-dioxide ($SiO_2$, K=3.9) and silicon nitride ($Si_3N_4$, K=7.5) with a dielectric strength of $10^7$ V/cm each are known to be effective dielectric materials. DEP with $Si_3N_4$ and $SiO_2$ as dielectric coating is also known prevent cell adhesion to the surface. In addition, materials such as Bovine Serum Albumin (BSA), Poly methyl methacrylate (PMMA), and monolayer dispersion of proteins can be used to prevent cell sticktion to the surface. Furthermore, it is preferable that the coating be readily applied and removed in order to enable reusability of the liquid/particle processing facilitated by DEP. In case of samples containing DNA, we may alternatively apply coating to promote adhesion of specific types of DNA strands on to surfaces above particle DEP electrodes. Here adhesion of selective DNA fragment is enhanced in the vicinity of high field regions created by positive DEP force. This capability may be useful in the analysis of DNA transported in droplets.

Immaterial modifications may be made to the embodiments described without departing from the invention.

REFERENCES

1. K. V. I. S. Kaler and H. A. Pohl (1983), "Dynamic dielectrophoretic levitation of living cells", IEEE Trans. Ind. Apps., 1A-19, pp 1089-1093.
2. Youlan Li and K. V. I. S. Kaler (2004), "Dielectrophoretic fluidic cell fractionation system," Analytica Chimica Acta, 507, pp 151-161.
3. K. Thirukumaran T., Christopher J. Backhouse, K. V. I. S. Kaler (2004), "Dielectrophoresis (DEP) of cells and microparticles in PDMS microfluidic channels", Proc., Nanotech 2004 (Boston, Mass., USA, Mar. 7-11, 2004), 1-2, pp 81-84.
4. Ronald Pethig, Ying Huang, Xiao-Bo Wang and Julian P H Burt (1992), "Positive and negative dielectrophoretic collection of colloidal particles using interdigitated castellated micro-electrodes", J. Phys. D: Appl. Phys., 25, pp 905-912.
5. T. B. Jones, M. Gunji and M. Washizu (2000), "Dielectrophoretic microfluidic devices," Proc. of IEJ/ESA Joint Symposium on Electrostatics, pp 78-87.
6. T. B. Jones, M. Gunji, M. Washizu, M. J. Feldman (2001), "Dielectrophoretic liquid actuation and nanodroplet formation", J. Applied Physics, 89 (3), pp 1-8.
7. Osamu Yogi, Tomonori Kawakami, Akira Mizuno, "On-Demand Mixing Droplet Spotter for Preparing Picoliter Droplets on Surfaces", Anal. Chem., 2004, 76 (11).
8. Peter R. C. Gascoyne, Jody Vykoukal, Frederick F. Becker, "Wall-less channels for fluidic routing and confinement", United States Patent Application Publication, US 2003/0173223, 2003.
9. T. B. Jones, "Electrostatics and Lab on a chip", Institute of Physics Congress, 2003.
10. R. Ahmed, D. Hsu, C. Bailey, and T. B. Jones, "Dispensing picoliter droplets using dielectrophoretic (DEP) microactuation," Microscale Thermophysical Engineering, vol. 8, pp. 271-283, 2004.
11. R. Ahmed and T. B. Jones, "Dispensing picoliter droplets on a substrate using dielectrophoresis," presented at 5th International Electrohydrodynamics Workshop, Poitiers, France, September, 2004, pp. 283-288.
12. M. R. King, O. Lomakin, R. Ahmed, and T. B. Jones, "Rapid flow fractionation of particles using microfluidics and dielectrophoresis," J. Appl. Phys., vol. 97, 054902, 2005.

What is claimed is:

1. A DEP-actuated microfluidic device, comprising:

a first dielectrophoretic actuator incorporating a first set of electrodes defining a first flow path for liquid, the first flow path extending to an intermediate electrode station;

a second dielectrophoretic actuator incorporating a second set of electrodes defining a second flow path for liquid extending from the intermediate electrode station to a plurality of electrode stations; and the intermediate electrode station incorporating electrodes configured for establishing an electric field gradient at the intermediate electrode station that is capable of isolating particles carried by the liquid upon application of a dielectrophoretic voltage to the electrodes at the intermediate electrode station, the intermediate electrode station comprising a traveling wave dielectrophoretic actuator.

2. The DEP-actuated microfluidic device of claim 1 in which the first set of electrodes and the first flow path extend to plural intermediate stations.

3. The DEP-actuated microfluidic device of claim 1 further comprising multiple dielectrophoretic actuators, each of the multiple dielectrophoretic actuators incorporating a set of electrodes defining a flow path for liquid extending from respective ones of the intermediate electrode stations to respective sets of electrode stations.

4. The DEP-actuated microfluidic device of claim 1 in which the electrode stations of the plurality of electrode stations are spaced at intervals corresponding to Rayleigh instability points.

5. The DEP-actuated microfluidic device of claim 1 in which the intermediate electrode station comprises interdigitated electrodes.

6. The DEP-actuated microfluidic device of claim 1 in which electrodes of the first set of electrodes, of the second set of electrodes and of the intermediate station are coated with a dielectric material.

7. The DEP-actuated microfluidic device of claim 1 in which electrodes of the first set of electrodes, of the second set of electrodes and of the intermediate station are patterned on a substrate.

8. The DEP-actuated microfluidic device of claim 7 in which the substrate is thermally conductive.

9. The DEP-actuated microfluidic device of claim 1 in which electrodes of the first set of electrodes, of the second set of electrodes and of the intermediate station incorporate heat dissipation structures.

10. The DEP-actuated microfluidic device of claim 1 in which the intermediate electrode station is provided with electrodes leading towards the intermediate electrode station from multiple droplet reservoirs, to enable mixing to take place at the intermediate electrode station.

11. The DEP-actuated microfluidic device of claim 1 in which the electrodes of the second set of electrodes define flow paths that terminate at an opening into a capillary.

12. A DEP-actuated microfluidic device, comprising:

a first dielectrophoretic actuator incorporating a first set of electrodes defining a first flow path for liquid, the first flow path extending to an intermediate electrode station;

a second dielectrophoretic actuator incorporating a second set of electrodes defining a second flow path for liquid extending from the intermediate electrode station to a plurality of electrode stations; and the intermediate electrode station incorporating electrodes configured for establishing an electric field gradient at the intermediate electrode station that is capable of isolating particles carried by the liquid upon application of a dielectrophoretic voltage to the electrodes at the intermediate electrode station, the intermediate electrode station comprising interdigitated electrodes.

13. The DEP-actuated microfluidic device of claim 12 in which the first set of electrodes and the first flow path extend to plural intermediate stations.

14. The DEP-actuated microfluidic device of claim 12 further comprising multiple dielectrophoretic actuators, each of the multiple dielectrophoretic actuators incorporating a set of electrodes defining a flow path for liquid extending from respective ones of the intermediate electrode stations to respective sets of electrode stations.

15. The DEP-actuated microfluidic device of claim 12 in which the electrode stations of the plurality of electrode stations are spaced at intervals corresponding to Rayleigh instability points.

16. The DEP-actuated microfluidic device of claim 12 in which electrodes of the first set of electrodes, of the second set of electrodes and of the intermediate station are coated with a dielectric material.

17. The DEP-actuated microfluidic device of claim 12 in which electrodes of the first set of electrodes, of the second set of electrodes and of the intermediate station are patterned on a substrate.

18. The DEP-actuated microfluidic device of claim 17 in which the substrate is thermally conductive.

19. The DEP-actuated microfluidic device of claim 12 in which electrodes of the first set of electrodes, of the second set of electrodes and of the intermediate station incorporate heat dissipation structures.

20. The DEP-actuated microfluidic device of claim 12 in which the intermediate electrode station is provided with electrodes leading towards the intermediate electrode station from multiple droplet reservoirs, to enable mixing to take place at the intermediate electrode station.

21. The DEP-actuated microfluidic device of claim 12 in which the electrodes of the second set of electrodes define flow paths that terminate at an opening into a capillary.

* * * * *

UNITED STATES PATENT AND TRADEMARK OFFICE

CERTIFICATE OF CORRECTION

PATENT NO. : 7,658,829 B2
APPLICATION NO. : 11/163628
DATED : February 9, 2010
INVENTOR(S) : Kanagasabapathi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this

Thirtieth Day of November, 2010

David J. Kappos

*Director of the United States Patent and Trademark Office*